(12) United States Patent
Luo

(10) Patent No.: US 7,525,801 B2
(45) Date of Patent: Apr. 28, 2009

(54) COMPUTER MODULE

(76) Inventor: Chin-Kuang Luo, 5F, No. 56, Min-Chuan Rd., Chung Dist., Taichung City (TW)

( * ) Notice: Subject to any disclaimer, the term of this patent is extended or adjusted under 35 U.S.C. 154(b) by 0 days.

(21) Appl. No.: 11/798,440

(22) Filed: May 14, 2007

(65) Prior Publication Data

US 2008/0106865 A1    May 8, 2008

(30) Foreign Application Priority Data

Nov. 8, 2006    (TW)    ............................... 95141395 A

(51) Int. Cl.
*H05K 7/20*    (2006.01)
(52) U.S. Cl. ........................ 361/700; 361/699; 361/701; 174/15.1; 165/104.21; 165/104.33
(58) Field of Classification Search .................. None
See application file for complete search history.

(56) References Cited

U.S. PATENT DOCUMENTS

| | | | | |
|---|---|---|---|---|
| 3,609,991 | A | | 10/1971 | Chu et al. |
| 4,027,728 | A | * | 6/1977 | Kobayashi et al. ...... 165/104.27 |
| 5,203,399 | A | * | 4/1993 | Koizumi ................ 165/104.33 |
| 5,383,340 | A | * | 1/1995 | Larson et al. .............. 62/259.2 |
| 5,587,880 | A | * | 12/1996 | Phillips et al. ............... 361/687 |
| 5,823,248 | A | * | 10/1998 | Kadota et al. .......... 165/104.33 |
| 5,940,270 | A | * | 8/1999 | Puckett ...................... 361/699 |
| 5,953,930 | A | * | 9/1999 | Chu et al. ................... 62/259.2 |
| 6,234,240 | B1 | | 5/2001 | Cheon |
| 6,837,063 | B1 | | 1/2005 | Hood, III et al. |
| 6,972,365 | B2 | * | 12/2005 | Garner ....................... 174/16.3 |
| 2005/0217829 | A1 | | 10/2005 | Belits et al. |
| 2006/0065386 | A1 | * | 3/2006 | Alam ..................... 165/104.33 |
| 2006/0272798 | A1 | * | 12/2006 | Liu et al. ............... 165/104.33 |
| 2007/0012427 | A1 | * | 1/2007 | Liu et al. ............... 165/104.26 |
| 2007/0246197 | A1 | * | 10/2007 | Reyzin et al. .......... 165/104.33 |

OTHER PUBLICATIONS

Pal et al., IEEE Transactions on Components and Packaging Technologies, vol. 25, No. 4, pp. 601-607, Dec. 2002.
Dmitry Khrustalev., 18 IEEE SEMI-THERM Symposium, ISBN: 0-7803-7327-8, pp. 145-150, 2002.

* cited by examiner

*Primary Examiner*—Boris L Chervinsky
(74) *Attorney, Agent, or Firm*—Birch, Stewart, Kolasch & Birch, LLP

(57) ABSTRACT

A computer module includes a housing having a cover defining a condenser chamber, and a heat-absorbing unit having at least one cavity body adapted to contact a heat source, and a working fluid received in the cavity body. A tubing unit is connected fluidly to the condenser chamber and the heat-absorbing unit. The working fluid flows through the tubing unit to circulate from the condenser chamber to the heat-absorbing unit by gravity and from the heat-absorbing unit to the condenser chamber by natural convection. The tubing unit forms a closed circulating loop with the heat-absorbing unit and the condenser chamber. The cover is adapted to exchange heat with external cold air so as to condense the working fluid in the condenser chamber.

5 Claims, 5 Drawing Sheets

COMPUTER MODULE

CROSS-REFERENCE TO RELATED APPLICATION

This application claims priority of Taiwanese Application No. 095141395, filed on Nov. 8, 2006.

BACKGROUND OF THE INVENTION

1. Field of the Invention

The invention relates to a computer module, more particularly to a computer module having a mechanism to dissipate heat.

2. Description of the Related Art

Referring to FIG. 1, a liquid-cooling heat dissipating system, as disclosed in Taiwanese Publication No. M295424, includes a heat sink 11 for exchanging heat with external cold air by natural convection, a thermoelectric cooler 12, a pressure-increasing pump 13 to circulate a working fluid within the system, a liquid-cooling connector 14 in contact with a heat source 2, three input pipes 15 for interconnecting the heat sink 11, the thermoelectric cooler 12, the pump 13, and the liquid-cooling connector 14 in series, an output pipe 16 connected fluidly to the heat sink 11 and the liquid-cooling connector 14, and a fan 17 for directing a current of cold air toward the heat sink 11. The heat source 2 may be a central processing unit of a computer. When the pressure-increasing pump 13 is activated, the working fluid in the liquid-cooling connector 14 circulates toward the heat sink 11 after absorbing the heat generated by the heat source 2. The heat sink 11 then exchanges heat with the external current of cold air so as to dissipate the heat. Although the aforementioned heat dissipating system can achieve its intended purpose, in actual practice, it has the following drawbacks:

1. Since the aforementioned liquid-cooling heat dissipating system relies on the pressure-increasing pump 13 to circulate the working fluid, the system not only has more components, is more costly, and is more noisy, but also generates more heat itself due to the pressure-increasing pump 13. This runs counter to efforts at reducing the temperature of the working fluid in the system and, therefore, reduces the cooling efficiency of the system.

2. If the aforementioned working fluid is water, the water will freeze when the system is used in an environment with a temperature lower than 0° C., thereby rendering the system useless. Further, if there is water leakage in the system, circuitry in the heat source 2 and/or elements of the system itself may be destroyed.

SUMMARY OF THE INVENTION

Therefore, the object of the present invention is to provide a computer module that is capable of overcoming the aforementioned drawbacks of the prior art.

According to this invention, a computer module comprises a housing, a heat-absorbing unit, and a tubing unit. The housing includes a cover defining a condenser chamber. The condenser chamber has an inlet, and an outlet that is disposed lower than the inlet. The heat-absorbing unit has at least one cavity body adapted to contact a heat source, and a working fluid received in the cavity body. The tubing unit is connected fluidly to the condenser chamber and the heat-absorbing unit. The working fluid flows through the tubing unit to circulate from the condenser chamber to the heat-absorbing unit by gravity and from the heat-absorbing unit to the condenser chamber by natural convection. The tubing unit forms a closed circulating loop with the heat-absorbing unit and the condenser chamber. The cover is adapted to exchange heat with external cold air so as to condense the working fluid in the condenser chamber.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
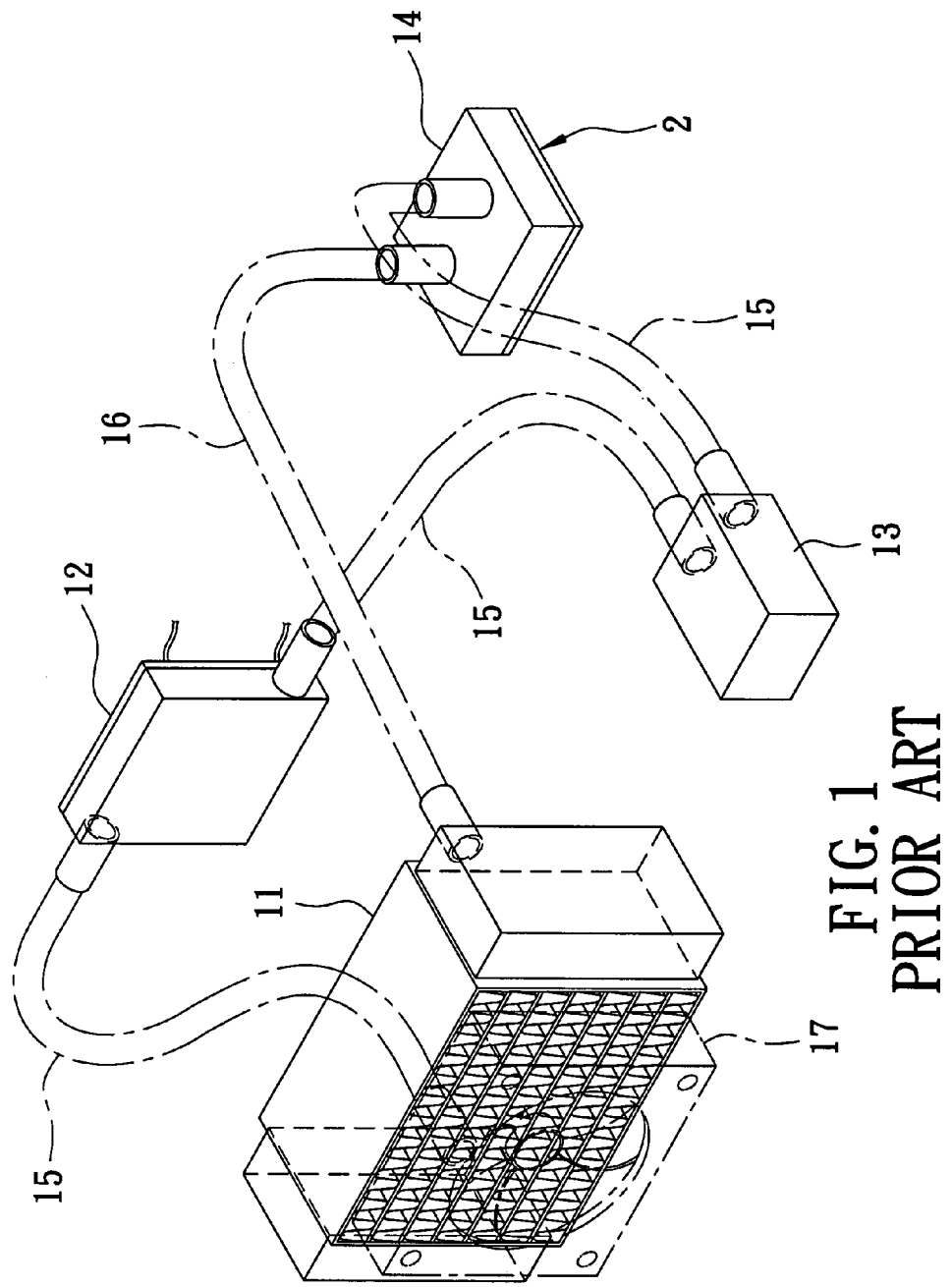
FIG. 1 is a perspective view of a conventional liquid-cooling heat dissipating system disclosed in Taiwanese Publication No. M295424.

Before the present invention is described in greater detail, it should be noted that the same reference numerals have been used to denote like elements throughout the specification.

Figure 2:
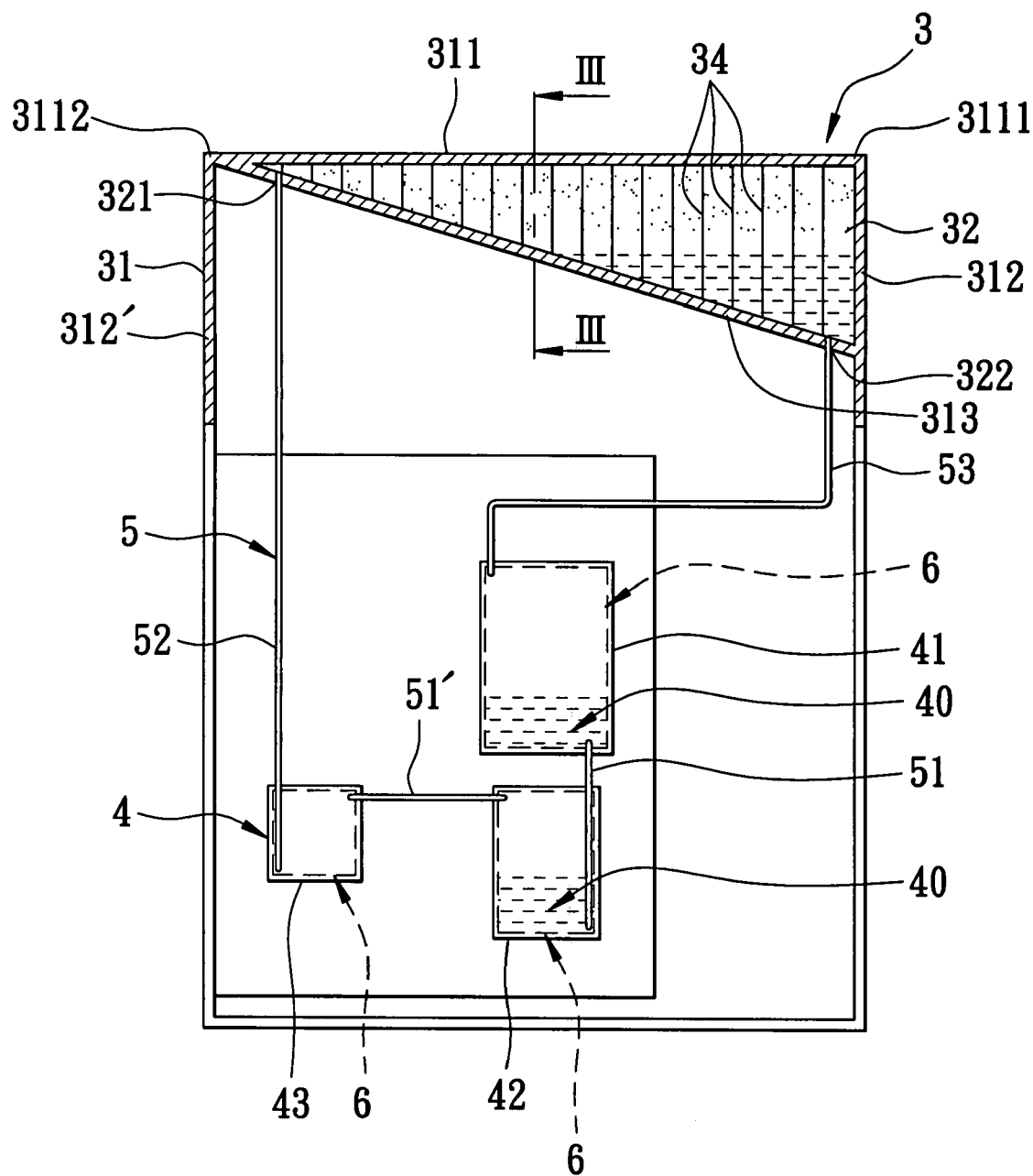
FIG. 2 is a partly sectional view of a computer module according to the first preferred embodiment of the present invention.
Figure 3:
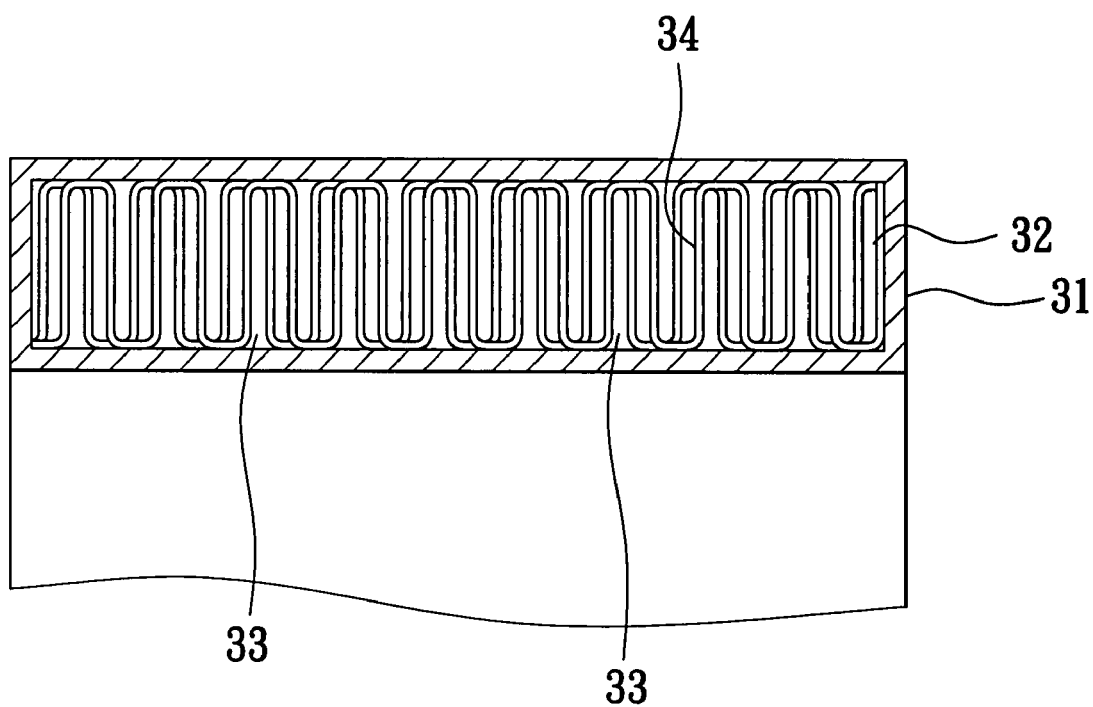
FIG. 3 is a sectional view of the first preferred embodiment taken along line III-III of FIG. 2.

Referring to FIGS. 2 and 3, a computer module according to the first preferred embodiment of the present invention is shown to comprise a housing 3, a heat-absorbing unit 4, and a tubing unit 5.

The housing 3, in this embodiment, is a housing of a desktop computer, and includes a cover 31 disposed at a top side of the housing 3 and defining a condenser chamber 32 having an inlet 321, and an outlet 322 that is disposed below the inlet 321. The cover 31 has a substantially horizontal top wall 311 having opposite first and second ends 3111, 3112, first and second side walls 312, 312' extending downwardly and respectively from the first and second ends 3111, 3112 of the top wall 311, and an inclined wall 313 extending from the second end 3112 and connected to the first side wall 312 below the first end 3111. The inlet 321 is disposed in the inclined wall 313 proximate to the second end 3112 of the top wall 311, whereas the outlet 322 is disposed in the inclined wall 313 proximate to the first side wall 312. A plurality of heat-dissipating fins 34 are disposed in the condenser chamber 32, and divide the condenser chamber 32 into a plurality of flow channels 33. The heat-dissipating fins 34 are preferably formed from a one-piece corrugated plate.

The heat-absorbing unit 4 is disposed in the housing 3, and includes three cavity bodies 41, 42, 43 respectively adapted to contact lowest-, medium-, and highest-temperature heat sources 6.

The tubing unit 5 includes two connecting tubes 51, 51' interconnecting the cavity bodies 41, 42, 43 in series, a vapor-flowing tube 52 connected fluidly to the cavity body 43 and the inlet 321 of the condenser chamber 32, and a liquid-flowing tube 53 connected fluidly to the cavity body 41 and the outlet 322 of the condenser chamber 32. As such, the connecting tubes 51, 51', the vapor-flowing and liquid-flowing tubes 52, 53, the condenser chamber 32, and the cavity bodies 41, 42, 43 form a closed circulating loop.

A working fluid 40 is injected into the computer module of the present invention after the connecting tubes 51, 51', the vapor-flowing and liquid-flowing tubes 52, 53, the cavity bodies 41, 42, 43, and the condenser chamber 32 are evacuated, so that the working fluid 40 circulates in a vacuum environment. In this embodiment, the working fluid 40 is a coolant that is in a liquid state at room temperature. Alternatively, the working fluid 40 may be a super-thermal-conductive liquid.

Initially, the working fluid 40 is in a liquid state, and is in the cavity bodies 41, 42. After the computer module is switched on, the liquid-state working fluid 40 in the cavity bodies 41, 42 is vaporized. As the pressure inside the cavity body 41 increases, the liquid-state working fluid 40 in the cavity body 41 is pressurized and is caused to flow through the connecting tube 51 and into the cavity body 42. As the pressure inside the cavity body 42 also increases, the working fluid 40 in a vaporized state flows through the connecting tube 51' and into the cavity body 43 where the temperature is the highest. The vaporized working fluid 40 then flows upward by natural convection through the vapor-flowing tube 52 from a high-density region, which is the cavity body 43, into a low-density region, which is the condenser chamber 32.

Since the cover 31 has a substantially large area in contact with external cold air, and since the heat-dissipating fins 34 increase the area of heat dissipation, the vaporized working fluid 40 in the condenser chamber 32 exchanges heat with the cover 31 and the heat-dissipating fins 34, condenses, and flows downward through the flow channels 33 by gravity. The working fluid 40 in a condensed state then flows from the outlet 322 back into the cavity body 41 through the liquid-flowing tube 53 by gravity so as to repeat the aforementioned steps. Hence, by circulating the working fluid 40 through the cavity bodies 41, 42, 43, the condenser chamber 32, the connecting tubes 51, 51', and the vapor-flowing and liquid-flowing tubes 52, 53, heat is effectively dissipated.

Figure 4:
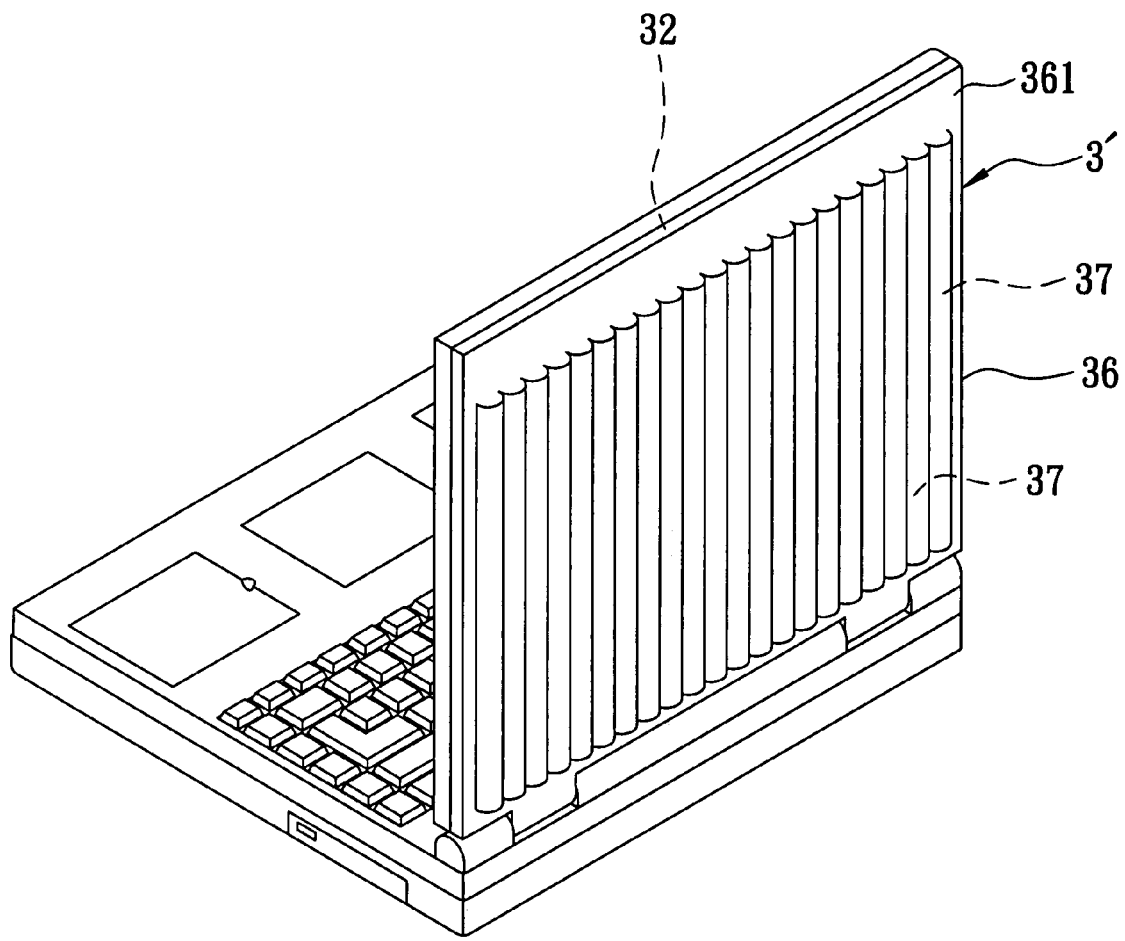
FIG. 4 is a perspective view of a computer module according to the second preferred embodiment of the present invention.

Referring to FIG. 4, a computer module according to the second preferred embodiment of the present invention is shown to be similar to the first preferred embodiment. However, in this embodiment, the housing 3' is a housing of a portable computer, and includes a hollow cover 36 having an outer wall 361. The outer wall 361 partially bounds the condenser chamber 32, is corrugated, and defines a plurality of intercommunicated channels 37.

Since the cover 36 has a substantially large area in contact with the external cold air, the vaporized working fluid 40 in the condenser chamber 32 exchanges heat with the cover 36 so as to condense the working fluid 40. The working fluid 40 in a condensed state flows downward through the channels 37 by gravity, thereby effecting heat dissipation.

Figure 5:
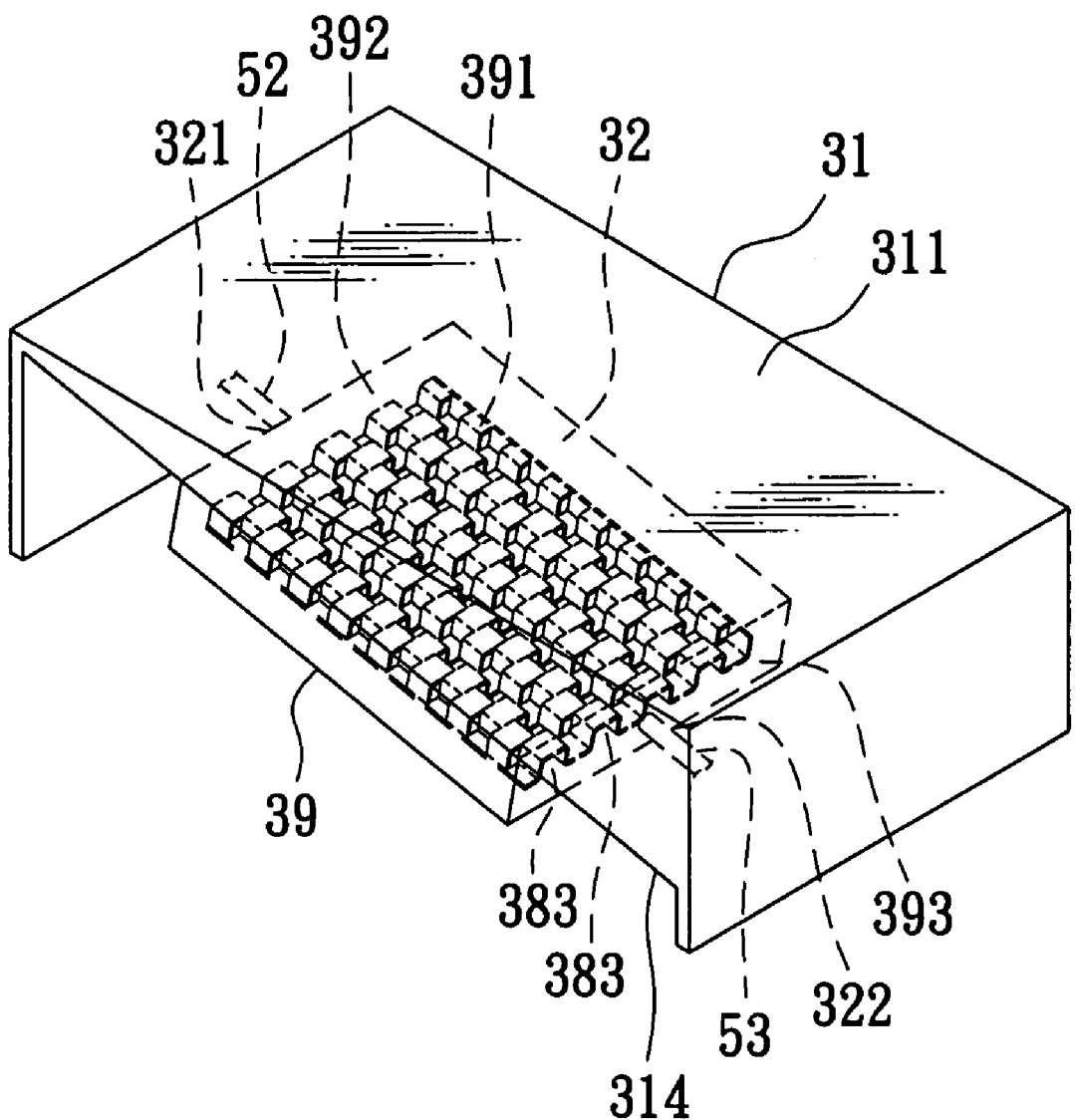
FIG. 5 is a perspective view of a computer module according to the third preferred embodiment of the present invention.

Referring to FIG. 5, a computer module according to the third preferred embodiment of the present invention is similar to the first preferred embodiment. However, while the cover 31 has a substantially horizontal top wall 311 as in the first preferred embodiment, in this embodiment, the cover 31 further has an inner wall 314 opposite to the top wall 311 and extending inclinedly with respect to the top wall 311, and a casing 39 that defines the condenser chamber 32 and that is in contact with and fixed to the inner wall 314 so that the inlet 321 of the condenser chamber 32 is disposed higher than the outlet 322 thereof. A plurality of heat-dissipating fins 391 are similarly disposed within the condenser chamber 32, and divide the condenser chamber 32 into a plurality of flow channels 383 that are inclined with respect to a horizontal plane or the top wall 311. The condenser chamber 32 further has a top end formed with a vapor-receiving section 392, and a bottom end formed with a liquid-receiving section 393. The inlet 321 is connected fluidly to the vapor-flowing tube 52, while the outlet 322 is connected fluidly to the liquid-receiving section 393.

The vaporized working fluid 40 flows upward by natural convection through the vapor-flowing tube 52 from a high-density region, which is the cavity body 43 (see FIG. 2), into a low-density region, which is the condenser chamber 32. The vaporized working fluid 40 in the condenser chamber 32 exchanges heat with the casing 39 and the heat-dissipating fins 391, and the heat is transferred to the cover 31 since the casing 39 is in contact with the cover 31. The cover 31, in turn, exchanges heat with the external cold air by natural convection, thereby effectively dissipating the heat. At the same time, the vaporized working fluid 40 condenses, and flows down the flow channels 383 by gravity into the liquid-receiving section 393. From the liquid-receiving section 393, the working fluid 40 in a condensed state then flows through the outlet 322 and into the cavity body 41 (see FIG. 2) through the liquid-flowing tube 53. Heat dissipation is similarly achieved using the third preferred embodiment.

From the aforementioned description, the advantages of the computer module of the present invention may be summarized as follows:

1. Through phase change of the working fluid 40 from liquid to vapor and vapor to liquid, through flowing of the working fluid 40 in a liquid state from a high place to a low place by gravity, and through flowing of the working fluid 40 in a vapor state from a high-density region to a low-density region by natural convection, the working fluid 40 can undergo a self-circulating effect. That is, a pressure-increasing pump is unneeded in the present invention, so that not only can noise be reduced to a minimum, but also self-generated heat may be minimized.

2. The working fluid 40 of the present invention, while in a liquid state, can effectively absorb heat from the heat sources 6 through heat conduction, and is then vaporized so as to exchange heat with the housing 3. As such, not only can a heat dissipating effect and efficiency be enhanced, through such utilization of the housing 3, which is an essential component of the computer module and which has a substantially large heat dissipating area, the computer module of the present invention realizes heat dissipation using simple components so as to reduce costs to a minimum.

3. The working fluid 40 of the present invention makes use of a coolant or a super-thermal-conductive liquid, so that no freezing of the working fluid 40 is likely to occur when the computer module is used in cold temperature environments of below 0° C. Hence, the heat dissipation process can be carried out smoothly. Further, even if there is a leak in the computer module, the working fluid 40 will turn immediately into vapor so as not to damage electronic circuitry and/or elements of the computer module.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A computer module, comprising:
   a housing including a cover defining a condenser chamber, and a plurality of heat-dissipating fins provided within said condenser chamber and dividing said condenser chamber into a plurality of flow channels that are inclined with respect to a horizontal plane, said condenser chamber having an inlet, and an outlet that is disposed lower than said inlet;

a heat-absorbing unit disposed in said housing and having at least one cavity body adapted to contact a heat source, and a working fluid received in said cavity body; and a tubing unit connected fluidly to said condenser chamber and said heat-absorbing unit, said working fluid flowing through said tubing unit to circulate from said condenser chamber to said heat-absorbing unit by gravity and from said heat-absorbing unit to said condenser chamber by natural convection, said tubing unit forming a closed circulating loop with said heat-absorbing unit and said condenser chamber;

wherein said cover is adapted to exchange heat with external cold air so as to condense said working fluid in said condenser chamber; and wherein said cover is disposed at a top side of said housing, and has a substantially horizontal top wall having opposite first and second ends, a side wall extending downwardly from said first end, and an inclined wall extending from said second end and connected to said side wall below said first end, said inlet being disposed in said inclined wall proximate to said second end, said outlet being disposed in said inclined wall proximate to said side wall.

2. The computer module of claim 1, wherein said heat-dissipating fins are formed from a corrugated plate.

3. The computer module of claim 1, wherein said tubing unit includes a liquid-flowing tube connected fluidly to said outlet of said condenser chamber and said cavity body, and a vapor-flowing tube connected fluidly to said inlet of said condenser chamber and said cavity body.

4. The computer module of claim 1, wherein said heat-absorbing unit includes a plurality of said cavity bodies, said tubing unit further including a plurality of connecting tubes, said cavity bodies being interconnected in series through said connecting tubes.

5. A computer module, comprising:

a housing including a cover defining a condenser chamber, and a plurality of heat-dissipating fins provided within said condenser chamber and dividing said condenser chamber into a plurality of flow channels that are inclined with respect to a horizontal plane, said condenser chamber having an inlet, and an outlet that is disposed lower than said inlet;

a heat-absorbing unit disposed in said housing and having at least one cavity body adapted to contact a heat source, and a working fluid received in said cavity body; and a tubing unit connected fluidly to said condenser chamber and said heat-absorbing unit, said working fluid flowing through said tubing unit to circulate from said condenser chamber to said heat-absorbing unit by gravity and from said heat-absorbing unit to said condenser chamber by natural convection, said tubing unit forming a closed circulating loop with said heat-absorbing unit and said condenser chamber;

wherein said cover is adapted to exchange heat with external cold air so as to condense said working fluid in said condenser chamber; and wherein said cover is disposed at a top side of said housing, and has a substantially horizontal top wall, and an inner wall opposite to said top wall and extending inclinedly with respect to said top wall, said cover further having a casing that is in contact with said inner wall and that defines said condenser chamber.

* * * * *